US012585390B2

(12) United States Patent
Seo

(10) Patent No.: US 12,585,390 B2
(45) Date of Patent: Mar. 24, 2026

(54) CONTROLLER, STORAGE DEVICE AND COMPUTING SYSTEM FOR ENSURING INTEGRITY OF DATA

(71) Applicant: SK hynix Inc., Gyeonggi-do (KR)

(72) Inventor: Myung Hwan Seo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 49 days.

(21) Appl. No.: 18/349,176

(22) Filed: Jul. 10, 2023

(65) Prior Publication Data

US 2024/0289030 A1    Aug. 29, 2024

(30) Foreign Application Priority Data

Feb. 24, 2023    (KR) ........................ 10-2023-0024691

(51) Int. Cl.
*G06F 3/06* (2006.01)

(52) U.S. Cl.
CPC .......... *G06F 3/0619* (2013.01); *G06F 3/0656* (2013.01); *G06F 3/0679* (2013.01)

(58) Field of Classification Search
CPC ..... G06F 3/0619; G06F 3/0656; G06F 3/0679
See application file for complete search history.

(56) References Cited

U.S. PATENT DOCUMENTS 9,256,542 B1 * 2/2016 Flower .................. G06F 3/0649
9,977,739 B2 * 5/2018 Kitora ................. G06F 11/1666

| | | | | |
|---|---|---|---|---|
| 11,531,473 | B1 * | 12/2022 | Ionin .................... | G06F 11/1068 |
| 2013/0326317 | A1 * | 12/2013 | Adler .................. | G06F 11/1004 |
| | | | | 714/800 |
| 2018/0129600 | A1 * | 5/2018 | Ishiyama ............ | G06F 11/1076 |
| 2019/0114220 | A1 | 4/2019 | Stenfort | |
| 2019/0196911 | A1 * | 6/2019 | Satoyama ............. | G06F 3/0619 |
| 2019/0212943 | A1 * | 7/2019 | Choi ..................... | G06F 3/0656 |
| 2019/0243566 | A1 * | 8/2019 | Hassan ................. | G06F 3/0604 |
| 2020/0133512 | A1 * | 4/2020 | Hodes ................... | G06F 3/0688 |
| 2020/0293676 | A1 * | 9/2020 | Hara ....................... | G06F 21/79 |
| 2022/0229586 | A1 | 7/2022 | Benisty et al. | |
| 2022/0236916 | A1 * | 7/2022 | Esaka ................... | G06F 3/0616 |
| 2022/0262441 | A1 * | 8/2022 | Kanamori .......... | G11C 16/3427 |
| 2022/0382452 | A1 * | 12/2022 | Inbar ..................... | G06F 3/0619 |
| 2024/0103731 | A1 * | 3/2024 | Saluja .................. | G06F 3/0679 |

FOREIGN PATENT DOCUMENTS

KR    10-2022-0080254 A    6/2022

* cited by examiner

*Primary Examiner* — Nanci N Wong
(74) *Attorney, Agent, or Firm* — IP & T GROUP LLP

(57) ABSTRACT

In an embodiment of the disclosed technology, parity information for external data inputted to a storage device is generated, and, depending on whether a parity transmission function is activated, or the state of a buffer memory of an external device located outside the storage device, the parity information is stored and managed in the buffer memory of the external device or a nonvolatile memory of the storage device. Thus, it is possible to efficiently manage the parity information and improve performance of ensuring integrity of the external data.

18 Claims, 7 Drawing Sheets

CONTROLLER, STORAGE DEVICE AND COMPUTING SYSTEM FOR ENSURING INTEGRITY OF DATA

CROSS-REFERENCE TO RELATED APPLICATION

The present application claims priority under 35 U.S.C. § 119(a) to Korean Patent Application No. 10-2023-0024691 filed on Feb. 24, 2023, which is incorporated herein by reference in its entirety.

BACKGROUND

1. Technical Field

Various embodiments of the present disclosure generally relate to a controller, a storage device and a computing system for ensuring integrity of data.

2. Related Art

A storage device may include a memory which includes a plurality of memory cells and stores data. Also, the storage device may include a controller which receives a command and data from the outside and controls the operation of the memory.

The controller may control the operation of the memory according to a command received from the outside. The controller may receive, from the outside, data to be stored in the memory or data to manage the data.

The command or data received by the controller from the outside may be damaged, and in this case, there is a concern in that the control of the memory by the controller cannot be normally performed.

SUMMARY

Various embodiments of the present disclosure are directed to a storage device capable of ensuring integrity of a command or data inputted from the outside and a controller capable of improving operational performance.

In an embodiment of the present disclosure, a storage device may include: a nonvolatile memory; and a controller configured to control an operation of the nonvolatile memory, generate, when receiving external data from an external device, parity information for the external data, and activate a parity transmission function to store the parity information in a buffer memory included in the external device or deactivate the parity transmission function to store the parity information in the nonvolatile memory.

In an embodiment of the present disclosure, a controller may include: a parity information generation module configured to generate, when receiving external data, parity information for the external data; and a parity information control module configured to store, when a first memory located outside is in an active mode, the parity information in the first memory, and store, when the first memory is in an inactive mode, the parity information in a second memory located inside or a third memory located outside.

In an embodiment of the present disclosure, an operating method of a controller may include: generating a parity for information provided from a host; controlling a memory device to store therein the information; causing, in a first mode, the host to store therein the parity; controlling, in a second mode, the memory device to store therein the parity;

and restoring, with the parity retrieved from one of the host and the memory device, the information from the memory device.

In an embodiment of the present disclosure, a computing system may include: a host device including a buffer memory, and configured to transmit host data; and a storage device configured to generate, when receiving the host data, parity information for the host data, and activate a parity transmission function to store the parity information in the buffer memory or deactivate the parity transmission function to store the parity information in a nonvolatile memory located inside.

According to the embodiments of the disclosed technology, since parity information on a command or data inputted from the outside of a storage device may be efficiently managed, the storage device may ensure integrity of the command or data received from the outside and improve performance of the storage device.

DETAILED DESCRIPTION

Figure 1:
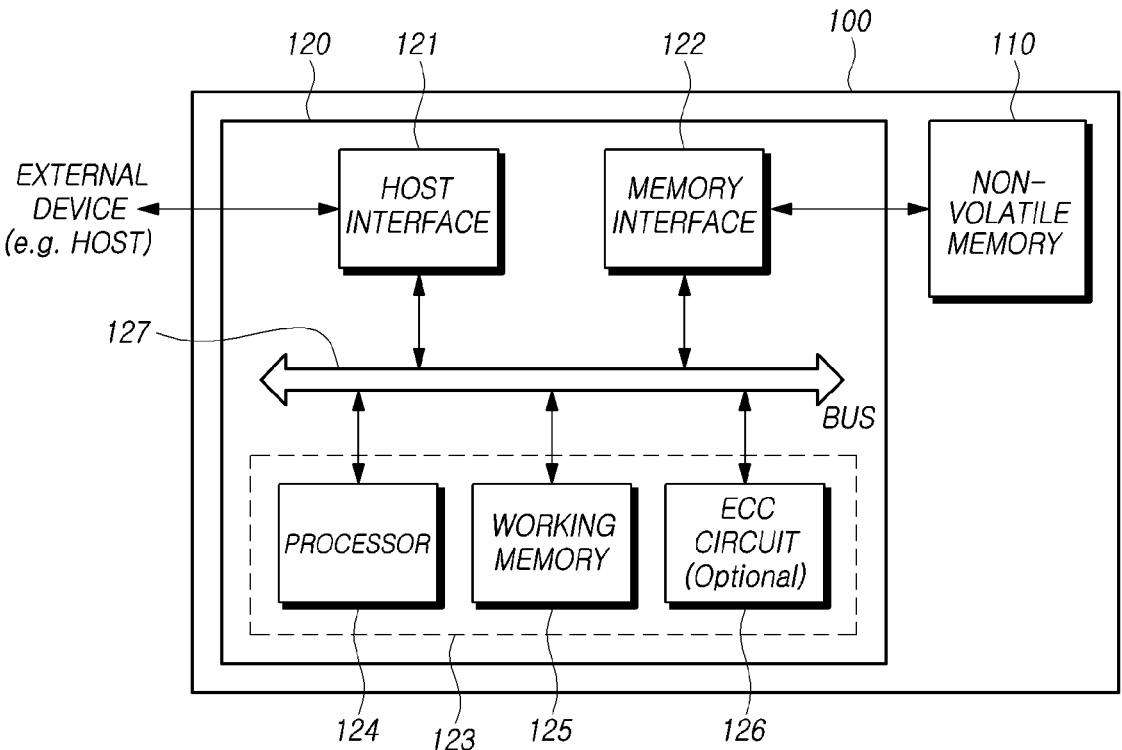
FIG. 1 is a diagram illustrating a configuration of a storage device according to an embodiment of the disclosed technology.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is disclosed that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or operations in operating, processing, manufacturing methods, these terms may be used to describe non-consecutive or non-sequential processes or operations unless the term "directly" or "immediately" is used together.

In addition, when any dimensions, relative sizes etc. are disclosed, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a diagram illustrating a configuration of a storage device 100 according to an embodiment of the disclosed technology.

Referring to FIG. 1, the storage device 100 may include a nonvolatile memory 110 which stores data, and a controller 120 which controls the nonvolatile memory 110.

The nonvolatile memory 110 may include a plurality of memory blocks, and may operate under the control of the controller 120. Operations of the nonvolatile memory 110 may include, for example, a read operation, a program operation (also referred to as a write operation) and an erase operation.

The nonvolatile memory 110 may include a memory cell array including a plurality of memory cells (simply referred to as "cells") which store data. Such a memory cell array may exist in a memory block.

For example, the nonvolatile memory 110 may be implemented into various types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The nonvolatile memory 110 may be implemented into a three-dimensional array structure. The embodiment of the disclosed technology may be applied to not only a flash memory in which a charge storage layer is configured by a conductive floating gate but also a charge trap flash (CTF) in which a charge storage layer is configured by a dielectric layer.

The nonvolatile memory 110 may receive a command and an address from the controller 120 and may access an area which is selected by the address in the memory cell array. The nonvolatile memory 110 may perform an operation indicated by the command, on the area selected by the address.

For example, the nonvolatile memory 110 may perform a program operation, a read operation and an erase operation.

When performing the program operation, the nonvolatile memory 110 may program data to the area selected by the address. When performing the read operation, the nonvolatile memory 110 may read data from the area selected by the address. In the erase operation, the nonvolatile memory 110 may erase data stored in the area selected by the address.

The controller 120 may control write (program), read, erase and background operations for the nonvolatile memory 110. For example, the background operation may include at least one among a garbage collection (GC) operation, a wear-leveling (WL) operation, a read reclaim (RR) operation, a bad block management (BBM) operation, and so forth.

The controller 120 may control the operation of the nonvolatile memory 110 according to a request from a device (e.g., a host) located outside the storage device 100. Also, the controller 120 may control the operation of the nonvolatile memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of driving under human control or autonomous driving, etc. Alternatively, the host may be a virtual/augmented reality device which provides a 2D or 3D virtual reality image or augmented reality image. The host may be any of various electronic devices which require the storage device 100 capable of storing data.

The host may include at least one operating system. The operating system may generally manage and control the function and operation of the host, and may provide interoperability between the host and the storage device 100. The operating system may be classified into a general operating system and a mobile operating system depending on the mobility of the host.

The controller 120 and the host may be devices which are separated from each other. As the case may be, the controller 120 and the host may be implemented by being integrated into one device. Hereunder, it will be described as an example that the controller 120 and the host are devices which are separated from each other.

Referring to FIG. 1, the controller 120 may include a memory interface 122, a control circuit 123, and a host interface 121.

The host interface 121 provides an interface for communication with the host. For example, the host interface 121 provides an interface which uses at least one among various communication standards or interfaces such as a USB (Universal Serial Bus) protocol, an MMC (multimedia card) protocol, a PCI (Peripheral Component Interconnection) protocol, a PCI-E (PCI-express) protocol, an ATA (Advanced Technology Attachment) protocol, a serial-ATA protocol, a parallel-ATA protocol, an SCSI (Small Computer System Interface) protocol, an ESDI (Enhanced Small Disk Interface) protocol, an IDE (Integrated Drive Electronics)

protocol, an SMBus (System Management Bus) protocol, an I2C (Inter-Integrated Circuit) protocol, an I3C (Improved Inter-Integrated Circuit) protocol and a private protocol.

When receiving a command from the host, the control circuit 123 may receive the command through the host interface 121, and may perform an operation of processing the received command.

The memory interface 122 may be coupled with the nonvolatile memory 110 to provide an interface for communication with the nonvolatile memory 110.

The memory interface 122 may provide an interface between the nonvolatile memory 110 and the controller 120 under the control of the control circuit 123.

The control circuit 123 may perform the general control operation of the controller 120 to control the operation of the nonvolatile memory 110. The control circuit 123 may include a processor 124 and a working memory 125, and may further include an error detection and correction circuit (ECC circuit) 126.

The processor 124 may control the general operation of the controller 120, and may perform a logic calculation. The processor 124 may communicate with the host through the host interface 121, and may communicate with the nonvolatile memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate it into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host, by using a set randomizing seed. The randomized data may be provided to the nonvolatile memory 110, and may be programmed to the memory cell array of the nonvolatile memory 110.

In a read operation, the processor 124 may derandomize data received from the nonvolatile memory 110. For example, the processor 124 may derandomize data received from the nonvolatile memory 110, by using a derandomizing seed. The derandomized data may be outputted to the host.

The processor 124 may execute firmware to control the operation of the controller 120. In order to control the general operation of the controller 120 and perform a logic calculation, the processor 124 may execute (drive) firmware loaded in the working memory 125 upon booting. Hereafter, an operation of the storage device 100 may be implemented in such a way that the processor 124 executes firmware in which the corresponding operation is defined.

Firmware, which may be a program to be executed in the storage device 100 to drive the storage device 100, may include various functional layers. For example, the firmware may include binary data in which codes for executing the functional layers, respectively, are defined.

For example, the firmware may include at least one among a flash translation layer (FTL) which performs a translating function between a logical address requested to the storage device 100 from the host and a physical address of the nonvolatile memory 110, a host interface layer (HIL) which serves to analyze a command requested to the storage device 100 from the host and transfer the command to the flash translation layer (FTL), and a flash interface layer (FIL) which transfers a command, instructed from the flash translation layer (FTL), to the nonvolatile memory 110.

Such firmware may be loaded in the working memory 125 from, for example, the nonvolatile memory 110 or a separate nonvolatile memory (e.g., a ROM or a NOR Flash) located outside the nonvolatile memory 110. The processor 124 may first load all or a part of the firmware in the working memory 125 when executing a booting operation after power-on.

The processor 124 may perform a logic calculation which is defined in the firmware loaded in the working memory 125, to control the general operation of the controller 120. The processor 124 may store a result of performing the logic calculation defined in the firmware, in the working memory 125. The processor 124 may control the controller 120 to generate a command or a signal, according to a result of performing the logic calculation defined in the firmware. When a part of firmware in which a logic calculation to be performed is defined is not loaded in the working memory 125, the processor 124 may generate an event (e.g., an interrupt) for loading the corresponding part of the firmware in the working memory 125.

The processor 124 may load metadata necessary for driving firmware, from the nonvolatile memory 110. The metadata, which is data for managing the nonvolatile memory 110, may include management information on user data stored in the nonvolatile memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data which are necessary to drive the controller 120. Such a working memory 125, for example, a volatile memory, may include at least one among an SRAM (static RAM), a DRAM (dynamic RAM) and an SDRAM (synchronous DRAM).

The error detection and correction circuit 126 may detect an error bit of target data and correct the detected error bit, by using an error correction code. The target data may be, for example, data stored in the working memory 125 or data read from the nonvolatile memory 110.

The error detection and correction circuit 126 may be implemented to decode data by using the error correction code. The error detection and correction circuit 126 may be implemented by various code decoders. For example, a decoder which performs unsystematic code decoding or a decoder which performs systematic code decoding may be used.

For example, the error detection and correction circuit 126 may detect an error bit by the unit of a set sector in each of read data. Each read data may be constituted by a plurality of sectors. The sector may mean a data unit smaller than a page as a read unit of a flash memory. Sectors constituting each read data may be matched with one another by the medium of an address.

The error detection and correction circuit 126 may calculate a bit error rate (BER), and may determine whether an error is correctable or not, by the unit of a sector. For example, when a bit error rate is higher than a set reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. When a sector included in read data is correctable, the error detection and correction circuit 126 may omit an error detection and correction operation for a corresponding sector for next read data. When the error detection and correction operation for all read data is ended in this way, the error detection and correction circuit 126 may detect a sector which is determined to be uncorrectable to the last. There may be one or more sectors which are determined to be uncorrectable. The error detection and correction circuit 126 may transfer information (e.g., address information) on a sector which is determined to be uncorrectable, to the processor 124.

A bus 127 may provide channels among the components 121, 122, 124, 125 and 126 of the controller 120. The bus 127 may include, for example, a control bus for transferring various control signals, commands and the likes, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. As the case may be, in addition to the above-described components 121, 122, 124, 125 and 126 of the controller 120, one or more other components may be added.

The controller 120 may generate and manage information for ensuring integrity of a command or data inputted from the outside. The controller 120 may store information for ensuring integrity, in a memory included in the storage device 100. The controller 120 may store information for ensuring integrity, in a memory located outside the storage device 100.

For example, the controller 120 may be allocated with a specific area of a memory included in a device located outside the storage device 100, and may store information for ensuring integrity of a command or data, in the corresponding area.

The device located outside the storage device 100 may be, for example, the host which transmits a command or data to the controller 120 of the storage device 100.

The controller 120 may store and manage information for ensuring integrity, in an area allocated in a memory included in the host. The controller 120 may manage information for ensuring integrity, in various ways depending on the state of the memory included in the host.

Figure 2:
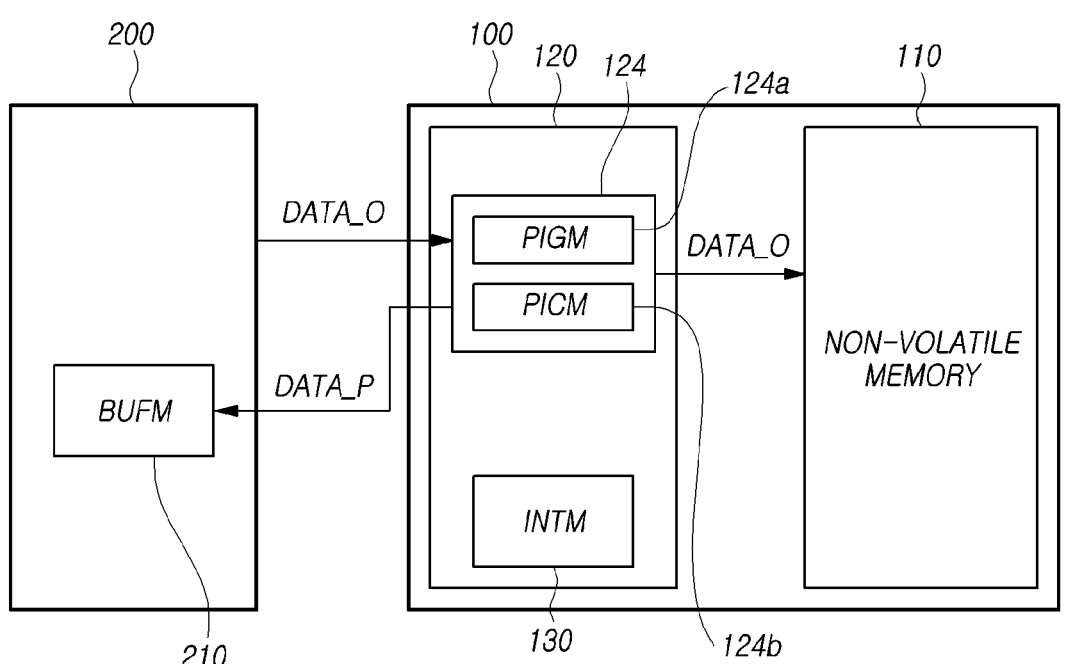
FIG. 2 is a diagram illustrating an example of managing parity information by a storage device according to an embodiment of the disclosed technology.

FIG. 2 is a diagram illustrating an example of managing parity information DATA_P by a storage device 100 according to an embodiment of the disclosed technology.

Referring to FIG. 2, the storage device 100 may include a nonvolatile memory 110 and a controller 120.

The controller 120 may include, for example, the processor 124 and an internal memory 130.

The processor 124 may include a parity information generation module 124a and a parity information control module 124b.

The internal memory 130 may be the aforementioned working memory 125 or may be a memory which is disposed separately from the working memory 125.

The storage device 100 may receive external data DATA_O from an external device 200 which is located outside the storage device 100. The storage device 100 and the external device 200 may be collectively referred to as a computing system.

The external device 200 may be, for example, the aforementioned host, but is not limited thereto. When the external device 200 is the host, the external data DATA_O may be host data.

The external device 200 may include a buffer memory 210. The buffer memory 210 may be, for example, a volatile memory. When the external device 200 is the host, the buffer memory 210 may be a host memory buffer which is included in the host.

The function of the host memory buffer may provide a mechanism by which the host may allocate a part of a host memory to be used by the controller 120. When a Set Features command for activating the host memory buffer is successfully processed, the host cannot use a host memory area associated with a host memory descriptor list.

For example, when the host memory buffer is activated, the Set Features command may be set to "1" and may interrupt the status code of a command sequence error. When the host memory buffer is deactivated, the Set Features command may be set to "0," and no action may be taken.

When the Set Features command for deactivating the host memory buffer is processed, the controller 120 cannot access data in the host memory buffer until the host memory buffer is activated. The controller 120 should recover necessary data from the host memory buffer before posting a completion queue entry for the Set Features command for deactivating the host memory buffer. The posting of the completion queue entry for the Set Features command for deactivating the host memory buffer may admit that it is safe for the host to modify the content of the host memory buffer.

Regarding the operation of the host memory buffer, various field values for the host memory buffer may be set.

For example, when the value of a memory return field of the host memory buffer is set to "1," the host may release a memory previously allocated to the controller 120. When the value of the memory return field of the host memory buffer is set to "0", the host may allocate host memory resources to the controller 120.

When the value of an active host memory field of the host memory buffer is set to "1," the host memory buffer is activated and the controller 120 may use the host memory buffer. When the value of the active host memory field of the host memory buffer is set to "0," the host memory buffer is deactivated and the controller 120 cannot use the host memory buffer.

A host memory buffer size field of the host memory buffer may designate the size of the allocated host memory buffer.

A host memory descriptor list lower address field of the host memory buffer may designate least significant 32 bits in the physical location of a host memory descriptor list for the host memory buffer.

A host memory descriptor list upper address field of the host memory buffer may designate most significant 32 bits in the physical location of the host memory descriptor list for the host memory buffer.

A host memory descriptor list entry number field of the host memory buffer may designate the number of entries provided in the host memory descriptor list.

A buffer size field of the host memory buffer may indicate the number of consecutive memory page sizes.

A buffer address field of the host memory buffer may indicate a host memory address aligned according to the memory page sizes.

The external data DATA_O may be, for example, a command or data (e.g., firmware data or metadata) including information for management of data to be stored in the storage device 100, the command or the data to be inputted to the storage device 100. When a damage to the external data DATA_O occurs, the controller 120 may generate and manage parity information DATA_P for preventing an abnormal operation.

For example, when the external data DATA_O is inputted from the external device 200, the parity information generation module 124a of the processor 124 may generate the parity information DATA_P for the external data DATA_O.

When a command from the external device 200 is inputted, the parity information generation module 124a may generate the parity information DATA_P on the corresponding command.

When firmware data necessary for the operation of the nonvolatile memory 110 or metadata for management of data to be stored in the nonvolatile memory 110 is received from the external device 200, the parity information generation module 124a may generate the parity information DATA_P on the firmware data or the metadata.

The parity information DATA_P may be one of types of information usable to recover the external data DATA_O when the external data DATA_O is damaged, and is not limited to a specific type.

The parity information control module 124b of the processor 124 may activate or deactivate a parity transmission function of transmitting the parity information DATA_P to the outside.

When activating the parity transmission function, the parity information control module 124b of the processor 124 may store, in an area allocated in the buffer memory 210 included in the external device 200, the parity information DATA_P generated by the parity information generation module 124a. On the other hand, the parity information control module 124b may deactivate the parity transmission function and store the parity information DATA_P in a memory located inside the storage device 100, such as the nonvolatile memory 110.

The parity information control module 124b of the processor 124 may store the external data DATA_O received from the external device 200 in a designated area of the nonvolatile memory 110. The designated area of the nonvolatile memory 110 may be an area in which data for management of data to be stored in the nonvolatile memory 110 is stored and may be set to be inaccessible from the outside.

When the parity information control module 124b of the processor 124 stores the parity information DATA_P using the area of the buffer memory 210 of the external device 200, the external data DATA_O may be stored in the nonvolatile memory 110 located inside the storage device 100 and the parity information DATA_P may be stored in the buffer memory 210 located outside the storage device 100.

When a process according to the external data DATA_O is completed or the external data DATA_O is updated, the processor 124 may delete the parity information DATA_P of the corresponding external data DATA_O. The processor 124 may retain the parity information DATA_P in the buffer memory 210 until a deletion requirement of the parity information DATA_P is satisfied.

The processor 124 may store the parity information DATA_P for the external data DATA_O in the buffer memory 210 of the external device 200, and, when a damage to the external data DATA_O occurs, may recover the external data DATA_O using the parity information DATA_O stored in the buffer memory 210.

For example, when an abrupt shutdown occurs, the processor 124 may recover the external data DATA_O using the parity information DATA_P stored in the buffer memory 210 of the external device 200, and may perform an operation according to the recovered external data DATA_O or perform management of data stored in the nonvolatile memory 110 using the recovered external data DATA_O.

When recovering the external data DATA_O using the parity information DATA_P, the processor 124 may generate new parity information DATA_P for the recovered external data DATA_O. The processor 124 may store the new parity information DATA_P in the buffer memory 210 of the external device 200. The processor 124 may manage integrity of the external data DATA_O on the basis of the new parity information DATA_P stored in the buffer memory 210.

Each time the external data DATA_O is inputted by the external device 200, the processor 124 may generate parity information DATA_P and may store the generated parity information DATA_P in the buffer memory 210 of the external device 200 or update the stored parity information DATA_P.

During a period in which the parity information DATA_P is managed by the processor 124, the buffer memory 210 included in the external device 200 may be deactivated. For example, the buffer memory 210 of the external device 200 may operate in an active mode and an inactive mode.

During a period in which the buffer memory 210 is in the active mode, the processor 124 may manage the parity information DATA_P using the buffer memory 210. During at least a partial period of a period in which the buffer memory 210 is in the active mode and the inactive mode, the processor 124 may manage the parity information DATA_P using any of the memories included in the storage device 100.

Figure 3:
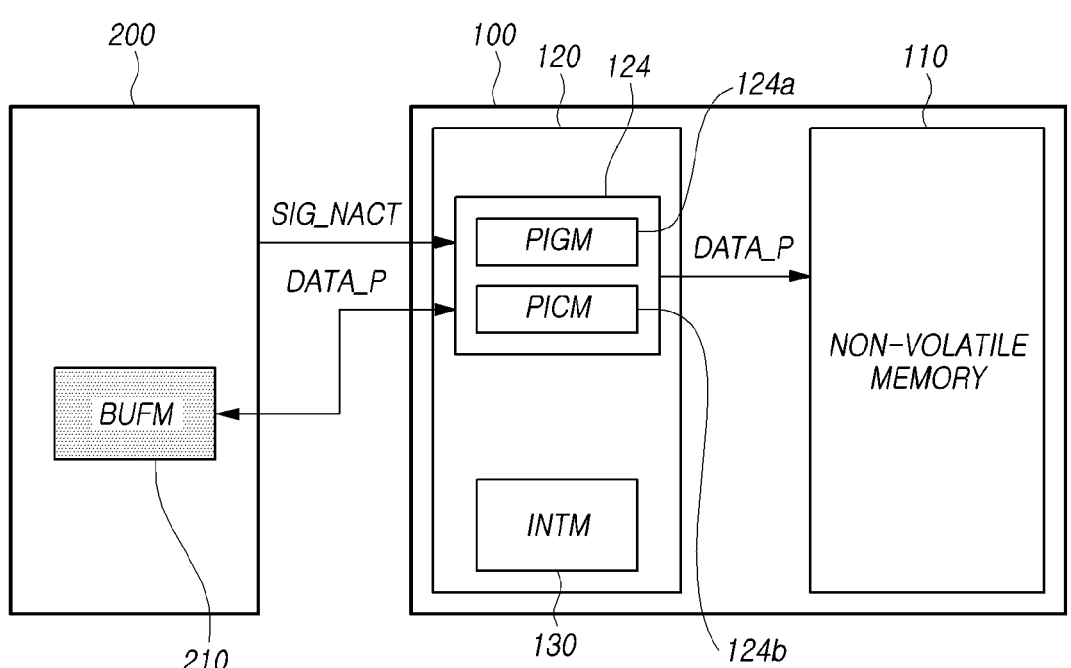
FIGS. 3 to 5 are diagrams illustrating other examples of managing parity information by the storage device according to an embodiment of the disclosed technology.
Figure 4:
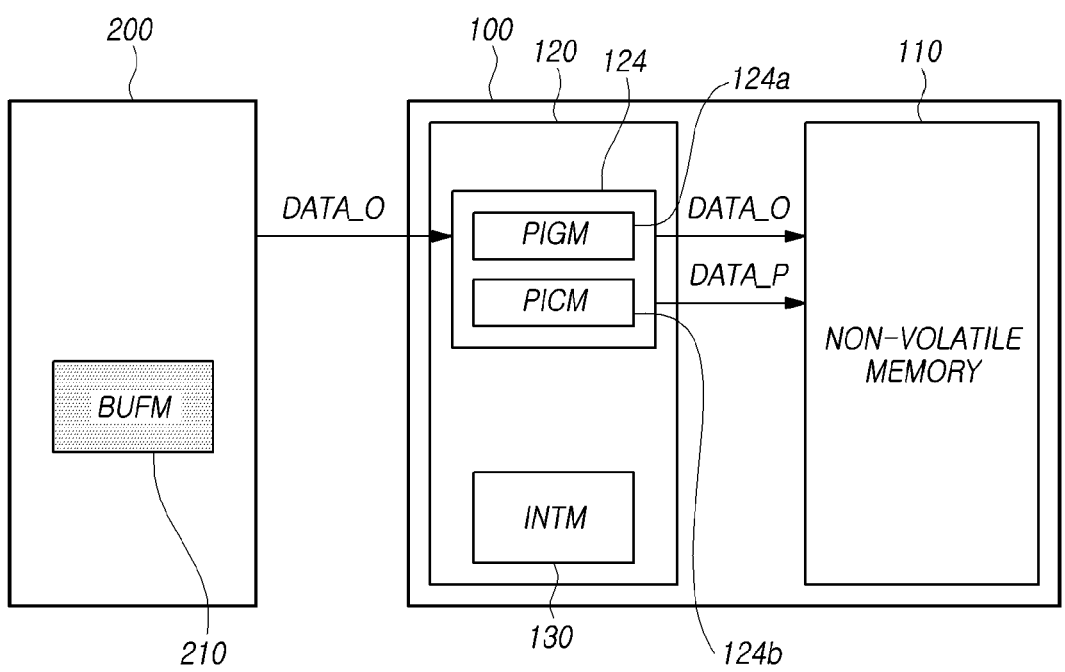
Figure 5:
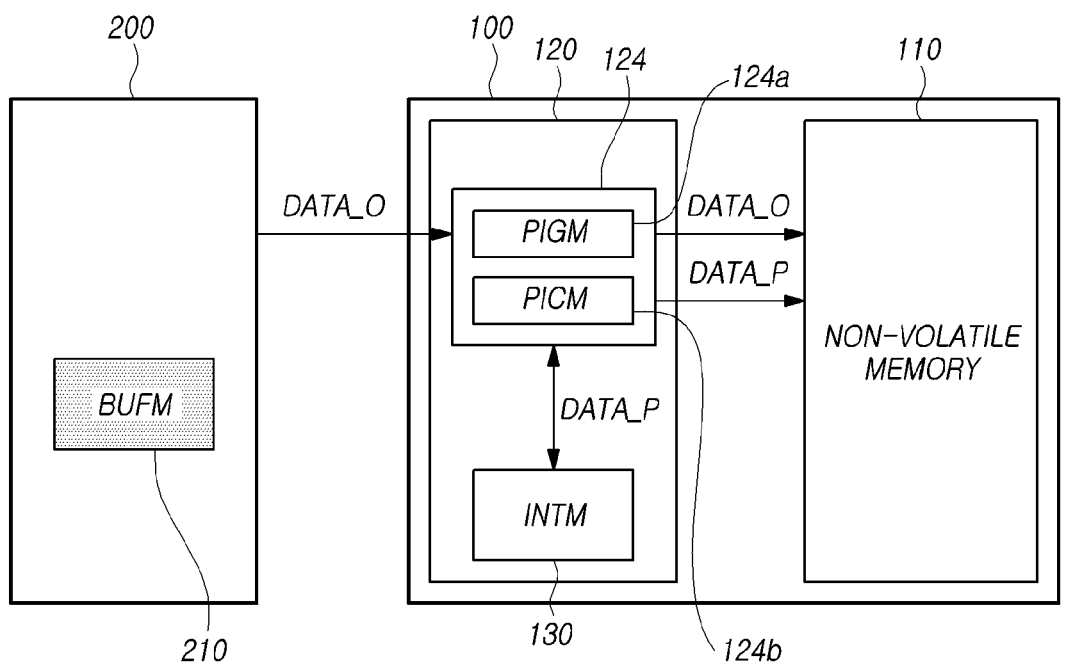

FIGS. 3 to 5 are diagrams illustrating other examples of managing parity information DATA_P by the storage device 100 according to an embodiment of the disclosed technology.

Referring to FIG. 3, when external data DATA_O is inputted by the external device 200, the processor 124 of the controller 120 may generate parity information DATA_P for the external data DATA_O. The processor 124 may manage the parity information DATA_P by activating or deactivating a parity transmission function.

For example, the processor 124 may activate the parity transmission function during a period in which the buffer memory 210 of the external device 200 is in an active mode. The processor 124 may store and manage the parity information DATA_P in the buffer memory 210.

When the buffer memory 210 of the external device 200 is changed from the active mode to an inactive mode, the external device 200 may transmit an inactive mode signal SIG_NACT to the controller 120.

When receiving the inactive mode signal SIG_NACT from the external device 200, the processor 124 of the controller 120 may deactivate the parity transmission function. The processor 124 may store, in a designated area of the nonvolatile memory 110, the parity information DATA_P stored in the buffer memory 210.

The designated area of the nonvolatile memory 110 may be an area which is allocated in the nonvolatile memory 110 to store the external data DATA_O. The external data DATA_O and the parity information DATA_P may be stored in the designated area of the nonvolatile memory 110.

When the buffer memory 210 of the external device 200 is in the inactive mode, the processor 124 may manage integrity of the external data DATA_O using the parity information DATA_P which is moved to and stored in the nonvolatile memory 110. When a damage to the external data DATA_O has occurred, the processor 124 may recover the external data DATA_O using the parity information DATA_P stored in the nonvolatile memory 110.

When recovering the external data DATA_O using the parity information DATA_P stored in the nonvolatile memory 110, the processor 124 may generate new parity information DATA_P of the recovered external data DATA_O. The processor 124 may store and manage the new parity information DATA_P in the nonvolatile memory 110.

Alternatively, as the case may be, when the buffer memory 210 of the external device 200 is changed to the inactive mode, the processor 124 may not store, in the nonvolatile memory 110, the parity information DATA_P stored in the buffer memory 210.

In this case, when new external data DATA_O is inputted by the external device 200 after the buffer memory 210 is in the inactive mode, the processor 124 may generate parity information DATA_P of the new external data DATA_O and store the generated parity information DATA_P in the nonvolatile memory 110.

Alternatively, regardless of whether the parity information DATA_P stored in the buffer memory 210 is stored in the nonvolatile memory 110 before the buffer memory 210 is in the inactive mode, the processor 124 may generate and manage parity information DATA_P for external data DATA_O which is inputted by the external device 200 in a state in which the buffer memory 210 is in the inactive mode.

For example, referring to FIG. 4, during a period in which the buffer memory 210 of the external device 200 is in an inactive mode, external data DATA_O may be inputted to the controller 120 by the external device 200.

When the external data DATA_O is inputted by the external device 200, the processor 124 of the controller 120 may generate parity information DATA_P for the external data DATA_O.

The processor 124 may deactivate a parity transmission function. The processor 124 may store the parity information DATA_P in the nonvolatile memory 110. An area in which the parity information DATA_P is to be stored in the nonvolatile memory 110 may be an area which is allocated to store the external data DATA_O. The external data DATA_O and the parity information DATA_P may be stored in the same area of the nonvolatile memory 110.

When the external data DATA_O is inputted by the external device 200 during the period in which the buffer memory 210 of the external device 200 is in the inactive mode, the processor 124 may generate the parity information DATA_P for the external data DATA_O and may store and manage the generated parity information DATA_P in the nonvolatile memory 110.

When a damage to the external data DATA_O is checked during the period in which the buffer memory 210 of the external device 200 is in the inactive mode, the processor 124 may recover the external data DATA_O using the parity information DATA_P stored in the nonvolatile memory 110.

Alternatively, as the case may be, the processor 124 may manage the parity information DATA_P by utilizing the internal memory 130 included in the controller 120. The internal memory 130 may be a memory which is mounted in the controller 120. The internal memory 130 may be, for example, a volatile memory.

For example, referring to FIG. 5, during a period in which the buffer memory 210 of the external device 200 is in an inactive mode, external data DATA_O may be inputted to the controller 120 of the storage device 100 by the external device 200.

The processor 124 of the controller 120 may generate parity information DATA_P for the external data DATA_O inputted by the external device 200.

The processor 124 may store the generated parity information DATA_P in the internal memory 130 included in the controller 120. Also, the processor 124 may store the parity information DATA_P in the nonvolatile memory 110.

For example, the processor 124 may determine whether to store the parity information DATA_P in the internal memory 130 on the basis of the size of the parity information DATA_P.

When the size of the parity information DATA_P is smaller than a preset size, the processor 124 may store the parity information DATA_P in the internal memory 130. When the size of the parity information DATA_P is equal to or larger than the preset size, the processor 124 may store the parity information DATA_P in the nonvolatile memory 110.

Alternatively, the processor 124 may determine whether to store the parity information DATA_P in the internal memory 130 on the basis of the size of a storage space allowed in the internal memory 130.

When the size of the space allowed to store the parity information DATA_P in the internal memory 130 is equal to or greater than a preset size, the processor 124 may store the parity information DATA_P in the internal memory 130. When the size of the space allowed to store the parity information DATA_P in the internal memory 130 is less than the preset size, the processor 124 may store the parity information DATA_P in the nonvolatile memory 110.

Alternatively, the processor 124 may determine whether to store the parity information DATA_P in the internal memory 130 based on the attribute of the external data DATA_O associated with the parity information DATA_P.

In the case of the parity information DATA_P for the external data DATA_O which has a high input frequency, the processor 124 may store and manage the parity information DATA_P in the internal memory 130 whose access speed is high. In the case of the parity information DATA_P for the external data DATA_O which has a low input frequency, the processor 124 may store and manage the parity information DATA_P in the nonvolatile memory 110.

Alternatively, as the case may be, the processor 124 may move the parity information DATA_P to and store and manage the parity information DATA_P in the internal memory 130 or the nonvolatile memory 110 on the basis of at least one of the size of the parity information DATA_P, the size of an allowed space of the internal memory 130 and the attribute of the external data DATA_O.

As such, according to the active/inactive state of the buffer memory 210 of the external device 200, the processor 124 may store and manage the parity information DATA_P for the external data DATA_O in one of the buffer memory 210 located outside the storage device 100 and the internal memory 130, and the nonvolatile memory 110 located inside the storage device 100.

In the present specification, the buffer memory 210 of the external device 200 may be referred to as a "first memory." In the present specification, the internal memory 130 may be referred to as a "second memory." In the present specification, the nonvolatile memory 110 may be referred to as a "third memory." The first memory and the second memory may be different from the third memory, and may be, for example, volatile memories.

During a period in which the first memory is in the active mode, the processor 124 of the controller 120 may activate the parity transmission function and may store and manage the parity information DATA_P for the external data DATA_O in the first memory located outside the storage device 100.

During a period in which the first memory is in the inactive mode, the processor 124 may deactivate the parity transmission function and may store and manage the parity information DATA_P for the external data DATA_O in the second memory located inside the controller 120 of the storage device 100 or the third memory located outside the controller 120 of the storage device 100.

When the buffer memory 210 of the external device 200 is changed from the inactive mode to the active mode, the processor 124 may manage the parity information DATA_P using the buffer memory 210 again.

Figure 6:
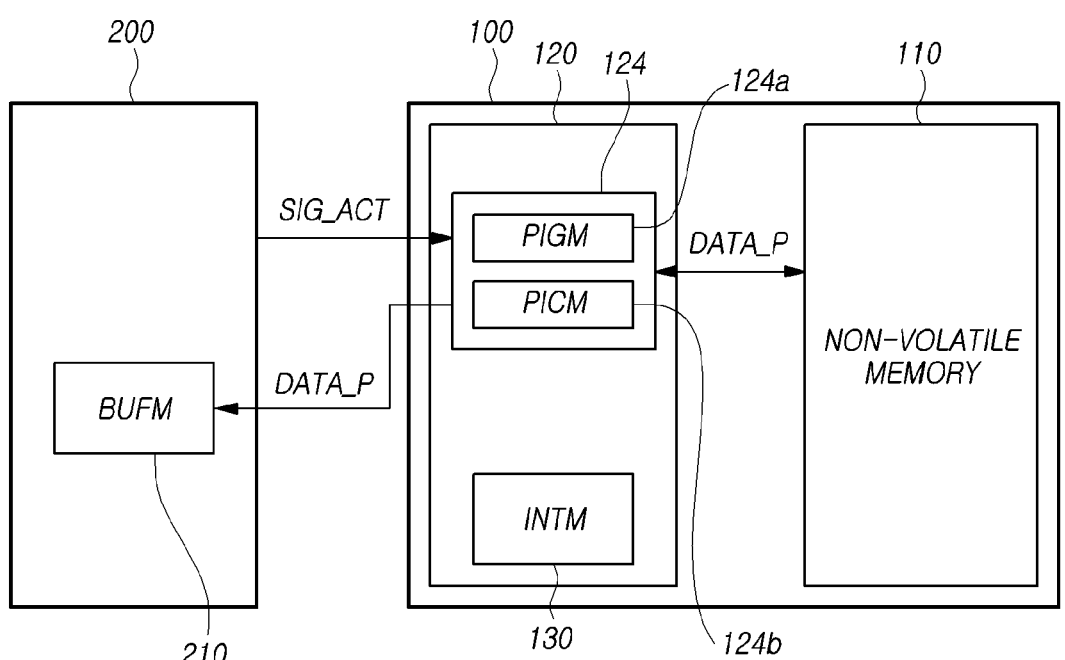
FIG. 6 is a diagram illustrating an example of managing parity information when a buffer memory included in an external device is changed from an inactive mode to an active mode, according to an embodiment of the disclosed technology.

FIG. 6 is a diagram illustrating an example of managing parity information DATA_P when the buffer memory 210 included in the external device 200 is changed from an inactive mode to an active mode, according to an embodiment of the disclosed technology.

Referring to FIG. 6, when changing the buffer memory 210 from an inactive mode to an active mode, the external device 200 may transmit an active mode signal SIG_ACT to the controller 120 of the storage device 100.

Before receiving the active mode signal SIG_ACT from the external device 200, the processor 124 of the controller 120 may deactivate a parity transmission function and may store, in the nonvolatile memory 110, parity information DATA_P generated according to the reception of external data DATA_O. As the case may be, the processor 124 may store at least a portion of the parity information DATA_P in the internal memory 130.

When receiving the active mode signal SIG_ACT from the external device 200, the processor 124 may activate the parity transmission function and may transmit, to the external device 200, the parity information DATA_P stored in the nonvolatile memory 110 or the internal memory 130 located inside the storage device 100. The external device 200 may receive the parity information DATA_P from the storage device 100, and may store the received parity information DATA_P in the buffer memory 210.

When the parity information DATA_P is stored in the buffer memory 210 of the external device 200, the processor 124 may delete the parity information DATA_P stored in the nonvolatile memory 110. As the case may be, the processor 124 may retain the parity information DATA_P stored in the nonvolatile memory 110.

When it is checked that a damage has occurred to the external data DATA_O associated with the parity information DATA_P stored in the buffer memory 210, the processor 124 may recover the external data DATA_O using the parity information DATA_P stored in the buffer memory 210. An access speed to the buffer memory 210 may be higher than an access speed to the nonvolatile memory 110, and recovery performance of the external data DATA_O using the parity information DATA_P may be improved.

In this way, the processor 124 of the controller 120 may efficiently manage a memory in which the parity information DATA_P for the external data DATA_O is to be stored, according to the active state of the buffer memory 210 included in the external device 200.

During periods in which the buffer memory 210 of the external device 200 is in the active mode and the inactive mode, the external data DATA_O may be easily recovered using the parity information DATA_P despite an abrupt shutdown situation by efficiently managing the parity information DATA_P for the external data DATA_O.

When the external device 200 is powered off, the processor 124 may store, in a memory inside the storage device 100, the parity information DATA_P stored in the buffer memory 210 of the external device 200.

Figure 7:
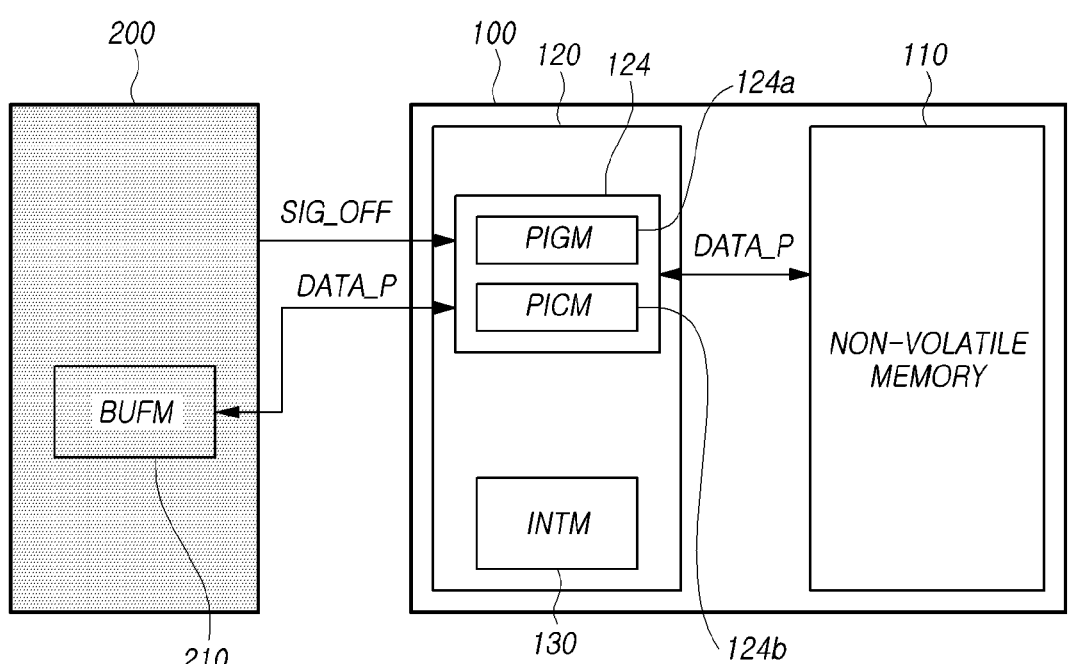
FIG. 7 is a diagram illustrating an example of managing parity information when the external device is powered off, according to an embodiment of the disclosed technology.

FIG. 7 is a diagram illustrating an example of managing parity information DATA_P when the external device 200 is powered off, according to an embodiment of the disclosed technology.

Referring to FIG. 7, in a state in which the buffer memory 210 of the external device 200 is in an active mode, the processor 124 of the controller 120 may generate and manage parity information DATA_P for external data DATA_O inputted by the external device 200.

The processor 124 may activate a parity transmission function and store the parity information DATA_P in the buffer memory 210 of the external device 200.

Before starting a power-off operation, the external device 200 may transmit a power-off signal SIG_OFF to the storage device 100.

When receiving the power-off signal SIG_OFF from the external device 200, the processor 124 may store, in a memory located inside the storage device 100, at least a portion of the parity information DATA_P stored in the buffer memory 210 of the external device 200.

For example, the processor 124 may store, in a designated area of the nonvolatile memory 110, the parity information DATA_P for ensuring integrity of firmware data at the time of next booting of the external device 200. The designated area of the nonvolatile memory 110 may be an area in which the external data DATA_O is stored.

The processor 124 may store, in the nonvolatile memory 110, the parity information DATA_P stored in the buffer memory 210 of the external device 200 and may use the stored parity information DATA_P to ensure integrity of firmware data at the time of next booting of the external device 200.

As such, based on an embodiment of the disclosed technology, by using the buffer memory 210 included in the external device 200 and the internal memory 130 or the nonvolatile memory 110 included in the storage device 100, the parity information DATA_P for the external data DATA_O inputted by the external device 200 may be managed.

When the buffer memory 210 of the external device 200 is in the active mode and the inactive mode, integrity of the external data DATA_O may be ensured. In addition, in a process in which the external device 200 is booted again after being powered off, integrity of the external data DATA_O may be ensured.

Moreover, according to the embodiment of the disclosed technology, even when a separate volatile memory is not disposed outside the controller 120 inside the storage device 100, provided may be the storage device 100 and a computing system capable of ensuring integrity of the external data DATA_O by efficient management of the parity information DATA_P.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments.

What is claimed is:

1. An operating method of a controller, the operating method comprising:

generating a parity for information provided from a host;

controlling a memory device to store therein the information;

activating, in a first mode, a parity transmission function and causing the host to store therein the parity;

deactivating, in a second mode, the parity transmission function and causing the memory device or an internal memory included in the controller to store therein the parity;

causing, when one of the first and second modes changes to the other, to move the parity between the host and the memory device; and restoring, with the parity retrieved from one of the host, the memory device or the internal memory, the information from the memory device, when damage to the information occurs, wherein, in the second mode, the parity information is stored in the memory device or the internal memory based on at least one of a size of the parity information, a size of an allowed space of the internal memory, or an attribute of the external data.

2. A storage device comprising: a nonvolatile memory; and a controller including an internal memory, and the controller is configured to:

control an operation of the nonvolatile memory, generate, when receiving external data from an external device, parity information for the external data, and activate a parity transmission function to store the parity information in a buffer memory included in the external device when the buffer memory is in an active mode, deactivate the parity transmission function to store the parity information in the nonvolatile memory or the internal memory when the buffer memory is in an inactive mode, and move the parity information stored in the buffer memory to the nonvolatile memory or the internal memory when the buffer memory is changed from the active mode to an inactive mode, and wherein, the external data is stored in the nonvolatile memory, and when the buffer memory is in the inactive mode, the parity information is stored in the nonvolatile memory or the internal memory based on at least one of a size of the parity information, a size of an allowed space of the internal memory, or an attribute of the external data, and the parity information is used to recover the external data when damage to the external data occurs.

3. The storage device according to claim 2, wherein the controller is further configured to store, in the nonvolatile memory or the internal memory, the parity information stored in the buffer memory when receiving, from the external device, an inactive mode signal of the buffer memory in a state in which the buffer memory is in the active mode.

4. The storage device according to claim 2, wherein the controller is further configured to store, in the nonvolatile memory or the internal memory, the parity information stored in the buffer memory when receiving, from the external device, a power-off signal in a state in which the buffer memory is in the active mode.

5. The storage device according to claim 2, wherein the controller is further configured to retain, until new parity information for new external data is generated, the parity information stored in the nonvolatile memory or the internal memory when receiving, from the external device, an active mode signal of the buffer memory in a state in which the buffer memory is in the inactive mode.

6. The storage device according to claim 2, wherein the controller is further configured to store, in the buffer memory, the parity information stored in the nonvolatile memory or the internal memory when receiving, from the external device, an active mode signal of the buffer memory in a state in which the buffer memory is in the inactive mode.

7. The storage device according to claim 6, wherein the controller is further configured to delete the parity information from the nonvolatile memory or the internal memory when storing the parity information in the buffer memory.

8. The storage device according to claim 2, wherein the controller stores the parity information in the nonvolatile memory when the buffer memory is in the inactive mode and the size of the parity information is equal to or greater than a preset size, and wherein the controller is further configured to store the parity information in the internal memory when the buffer memory is in the inactive mode and the size of the parity information is less than the preset size.

9. The storage device according to claim 2, wherein the controller stores the parity information in an area which is allocated for the external data in the nonvolatile memory in a state in which the buffer memory is in the inactive mode.

10. The storage device according to claim 2, wherein the controller is further configured to store the external data in the nonvolatile memory in a state in which the buffer memory is in the active mode.

11. The storage device according to claim 2, wherein the controller is further configured to recover the external data, which is damaged, using the parity information stored in the nonvolatile memory or the internal memory in a state in which the buffer memory is in the inactive mode.

12. The storage device according to claim 11, wherein the controller is further configured to generate new parity information of the recovered external data and store the new parity information in the nonvolatile memory or the internal memory.

13. The storage device according to claim 2, wherein the controller is further configured to delete the parity information when a process according to the external data is completed.

14. A controller comprising:

parity information generation circuitry configured to generate, when receiving external data, parity information for the external data; and parity information control circuitry configured to:

activate a parity transmission function to store the parity information in a first memory when the first memory located outside of the controller is in an active mode, deactivate the parity transmission function to store the parity information in a second memory located inside of the controller or a third memory located outside of the controller when the first memory is in an inactive mode, and move the parity information stored in the first memory to the second memory or the third memory when the first memory is changed from the active mode to an inactive mode, and wherein, the external data is stored in the third memory, and the parity information is stored in the second memory or the third memory based on at least one of a size of the parity information, a size of an allowed space of the second memory, or an attribute of the external data, and the parity information is used to recover the external data when damage to the external data occurs.

15. The controller according to claim 14, wherein the first memory and the second memory are volatile memories, and the third memory is a nonvolatile memory.

16. The controller according to claim 14, wherein the parity information control circuitry is further configured to store, in the second memory or the third memory, the parity information stored in the first memory when receiving an inactive mode signal of the first memory in a state in which the first memory is in the active mode.

17. The controller according to claim 14, wherein the parity information control circuitry is further configured to store, in the first memory, the parity information stored in the second memory or the third memory when receiving an active mode signal of the first memory in a state in which the first memory is in the inactive mode.

18. The controller according to claim 17,
wherein the parity information control circuitry stores the parity information in the first memory when the parity information is stored in the third memory, and
wherein the parity information control circuitry is further configured to retain the parity information in the second memory when the parity information is stored in the second memory.

* * * * *